(12) United States Patent
Abeywardena et al.

(10) Patent No.: US 12,495,213 B2
(45) Date of Patent: Dec. 9, 2025

(54) ADAPTIVE CAMERA EXPOSURE CONTROL FOR NAVIGATING A UAV IN LOW LIGHT CONDITIONS

(71) Applicant: WING AVIATION LLC, Mountain View, CA (US)

(72) Inventors: Dinuka Abeywardena, Mountain View, CA (US); Kyle Krafka, Los Altos, CA (US)

(73) Assignee: Wing Aviation LLC, Palo Alto, CA (US)

(*) Notice: Subject to any disclaimer, the term of this patent is extended or adjusted under 35 U.S.C. 154(b) by 122 days.

(21) Appl. No.: 18/611,045

(22) Filed: Mar. 20, 2024

(65) Prior Publication Data
US 2025/0301227 A1    Sep. 25, 2025

(51) Int. Cl.
| | |
|---|---|
| *G01S 19/47* | (2010.01) |
| *G05D 1/611* | (2024.01) |
| *G06V 10/141* | (2022.01) |
| *G06V 20/17* | (2022.01) |
| *H04N 23/73* | (2023.01) |
| *G05D 105/20* | (2024.01) |
| *G05D 109/20* | (2024.01) |
| *G05D 111/10* | (2024.01) |

(52) U.S. Cl.
CPC ............ *H04N 23/73* (2023.01); *G05D 1/611* (2024.01); *G06V 10/141* (2022.01); *G06V 20/17* (2022.01); *G05D 2105/20* (2024.01); *G05D 2109/20* (2024.01); *G05D 2111/10* (2024.01)

(58) Field of Classification Search
CPC .... H04N 23/73; G05D 1/611; G05D 2105/20; G05D 2109/20; G05D 2111/10; G06V 10/141; G06V 20/17
See application file for complete search history.

(56) References Cited

U.S. PATENT DOCUMENTS

| | | | | |
|---|---|---|---|---|
| 12,211,300 B1 * | 1/2025 | Becker | ................ | H04N 23/60 |
| 12,266,131 B2 * | 4/2025 | Bachrach | ............... | G05D 1/243 |
| 2015/0097951 A1 * | 4/2015 | Barrows | ................ | H04N 25/76 |
| | | | | 901/1 |

(Continued)

FOREIGN PATENT DOCUMENTS

| | | | | | |
|---|---|---|---|---|---|
| CN | 108844538 B | * | 1/2021 | ........... | G01C 21/165 |
| CN | 114661061 A | * | 6/2022 | ............. | G06N 3/045 |
| WO | WO-2022212135 A1 | * | 10/2022 | ............. | G06V 20/17 |

OTHER PUBLICATIONS

PCT Invitation to pay additional fees with Annex Partial International Search Report mailed Apr. 28, 2025, in corresponding International Application No. PCT/US2025/017240, 10 pages.

(Continued)

*Primary Examiner* — Howard D Brown, Jr.
(74) *Attorney, Agent, or Firm* — Christensen O'Connor Johnson Kindness PLLC

(57) ABSTRACT

A technique of camera exposure control for vision-based navigation of an unmanned aerial vehicle (UAV) includes acquiring an aerial image of a ground area below the UAV with an onboard camera system of the UAV, estimating a visual motion factor based on a speed of the UAV and an altitude of the UAV, and adjusting an exposure control setting of the onboard camera system based on the visual motion factor.

21 Claims, 7 Drawing Sheets

(56) References Cited

U.S. PATENT DOCUMENTS

| | | | |
|---|---|---|---|
| 2017/0078553 A1 | 3/2017 | Sron et al. | |
| 2018/0024547 A1* | 1/2018 | Balachandran | G05D 1/0094 |
| | | | 701/2 |
| 2018/0074519 A1* | 3/2018 | Qin | G05D 1/0094 |
| 2020/0137312 A1* | 4/2020 | Koyama | F16M 13/02 |
| 2021/0129982 A1* | 5/2021 | Collins | B64U 10/60 |
| 2022/0120918 A1* | 4/2022 | Makineni | G01S 19/53 |
| 2022/0315220 A1* | 10/2022 | Bachrach | G05D 1/243 |
| 2022/0404830 A1 | 12/2022 | Jobanputra et al. | |
| 2023/0118105 A1 | 4/2023 | Agarwal et al. | |
| 2025/0216745 A1* | 7/2025 | Krafka | G06V 20/17 |

OTHER PUBLICATIONS

PCT International Search Report and Written Opinion mailed Jun. 18, 2025, in corresponding International Application No. PCT/US2025/017240, 19 pages.

Scaramuzza et al., "Visual-Inertial Odometry of Aerial Robots," This paper has been accepted for publication in the Springer Encyclopedia of Robotics, 2019, © Springer, 13 pages.

Drones Made Easy, "Exposure Mode and Exposure Time," Tudor—Nov. 9, 2021, 1 page. <http://support.dronesmadeeasy.com/hc/en-us/articles/207392056-Exposure-Mode-and-Exposure-Time>.

Teledyne Lumenera, "The Challenge of Aerial Imaging: Achieving a Clear and Sharp Image", Posted on Jan. 29, 2018, 4 pages. <http://www.lumenera.com/blog/the-challenge-of-aerial-imaging-achieving-a-clear-and-sharp-image>.

Wikipedia, The Free Encyclopedia, "Visual odometry," Prior to Mar. 20, 2024, 5 pages retrieved from: <https://en.wikipedia.org/w/index.php?title=Visual_odometry&oldid=1181985411>.

\* cited by examiner

ADAPTIVE CAMERA EXPOSURE CONTROL FOR NAVIGATING A UAV IN LOW LIGHT CONDITIONS

TECHNICAL FIELD

This disclosure relates generally to unmanned aerial vehicles, and in particular but not exclusively, relates to exposure control for vision-based navigation of unmanned aerial vehicles.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments of first impression) across a wide range of times, the UAV should be capable of accurately identifying obstacles using vision-based navigation techniques in low light conditions to ensure it is maintaining safe operating margins.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
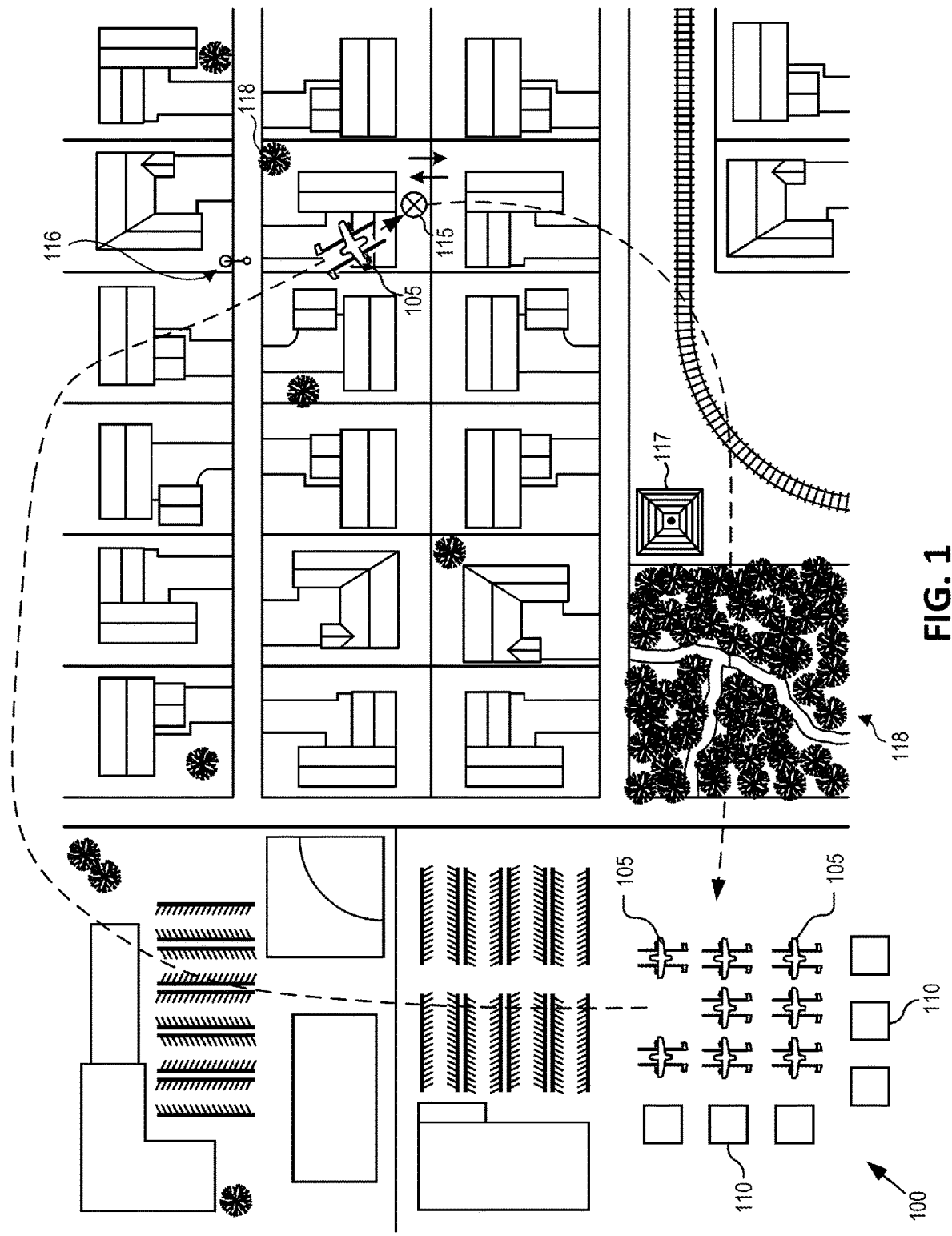
FIG. 1 illustrates operation of an unmanned aerial vehicle (UAV) delivery service that delivers packages into a neighborhood, in accordance with an embodiment of the disclosure.

Embodiments of a system, apparatus, and method of camera exposure control for vision-based navigation of an unmanned aerial vehicle (UAV) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Navigation systems that rely on aerial images captured from an onboard camera system can play a significant part in providing a highly available navigation system for UAVs. However, vision-based navigation systems often do not work well at night or other low light conditions due to the typical operation of auto-exposure/auto-gain functions in conventional camera systems. This limitation may be somewhat mitigated by adding illuminators to the UAV but these illuminators tend to be low powered due to the size, weight, heat, and power constraints of UAVs. Such low powered illuminators are typically only effective in close proximity to the ground, such as within 15 m above ground level (AGL). As the UAV climbs above the 15 m AGL altitude, the illuminators often do not sufficiently illuminate the ground for the onboard camera system to acquire aerial images with sufficient detail, contrast, and clarity for vision-based navigation.

One way to increase the amount of light captured by an onboard camera system is to increase exposure time, thereby allowing the image sensor to capture more photons. If the UAV is also moving, increasing the exposure time can result in deleterious motion blur in the aerial images. Motion blur adversely affects navigation algorithms. However, there is synergy between the problems of illuminators not being very effective high above the ground and the motion blur caused by long exposure times. When capturing an aerial image of the ground while flying over it, the amount of motion blur seen in the aerial image is inversely proportional to the AGL altitude. Therefore, when flying high over the ground, the exposure time of the onboard camera system can be increased over the exposure time otherwise recommended by the built in auto-exposure (AE) algorithm without undue motion blur adversely affecting image quality.

Embodiments disclosed herein actively control exposure control settings of an onboard camera system used for vision-based navigation based at least on altitude (e.g., estimated AGL altitude). The exposure control settings may include any setting that affects image luminance or brightness. For example, exposure control settings may include one or more of exposure time (e.g., shutter speed or integration time), aperture size, sensor gain, or illuminator brightness. In one embodiment, built-in AE function (which often includes auto-gain (AG) functionality) may provide an initial recommendation for the exposure control settings and the techniques herein may be used to offset or nudge those initial AE settings to an optimized value for vision-based autonomous navigation of UAVs.

As mentioned, embodiments described herein may use at least an estimated AGL altitude to adjust the exposure control settings of the onboard camera system used for vision-based navigation. While the estimated AGL altitude may be used directly, in some embodiments, the estimated AGL altitude may be combined with other data to estimate a visual motion factor, which is used to adjust the exposure control settings. The visual motion factor itself is an estimate of how much motion is occurring, in pixel space, during an aerial image exposure. The visual motion factor may be estimated based on UAV speed (e.g., speed over ground), altitude (e.g., AGL altitude), and even rotational velocity of the UAV.

Embodiments described herein may apply multiple techniques, in addition to or in lieu of, estimating the visual motion factor to further determine optimal exposure control settings. These techniques may include counting a total number of features in the aerial images being tracked and/or the temporal length or persistence of tracking those features. The greater number of features being tracked or the longer a feature track persists can be a proxy for determining optimal exposure control settings for vision-based navigation. Exposure control settings may be sequentially perturbed to see how the various downstream visual tracking modules are affected and a feedback loop applied to step towards improved settings. Different mission phases may even correlate to particular adjustments or offsets from the initial AE settings. In other embodiments, the UAV may hover above a delivery destination before descending to the delivery height and acquire long exposure images and/or multiple aerial images for image stacking. In yet another embodiment, one or more image modalities may be selected based upon mission phase and pulsed to further improve image quality. These and other embodiments are described in greater detail below.

FIG. 1 illustrates operation of a UAV delivery service that delivers packages into a neighborhood, in accordance with an embodiment of the disclosure. UAVs may one day routinely deliver items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include multiple mission phases such as takeoff from terminal area 100 with a package for delivery to a destination area 115 (also referred to as a delivery zone, drop zone, or delivery destination), rising to a cruising altitude, and cruising to the customer destination. At destination area 115, UAV 105 descends for package drop-off before once again ascending to a cruise altitude for the return cruise back to terminal area 100. Accordingly, a delivery mission may include the following mission phases: takeoff, rising to a cruise altitude, cruising to destination, descending to the destination area, hovering while delivering the package, rising to a return cruise altitude, return cruise to terminal area 100, descending, and landing on a charging pad. Of course, other mission phases may be executed for waypoint package pickups or otherwise.

During the course of a delivery mission, ground-based obstacles are an ever present hazard-particularly tall slender obstacles such as streetlights 116, telephone poles, radio towers 117, cranes, trees 118, etc. Some of these obstacles may be persistent unchanging obstacles (e.g., streetlights, telephone poles, radio towers, etc.) while others may be temporary (cranes, etc.), or ever changing/growing (e.g., trees). Regardless, vision-based navigation techniques for identifying and avoiding these obstacles are important. These ground-based obstacles may be tall enough to present a hazard during cruise flight segments enroute to-and-fro destination 115 or present an acute hazard when descending to destination 115 or ascending from destination 115. Accordingly, embodiments described herein present techniques for adjusting the exposure control settings of the onboard camera system of a UAV to provide improved vision-based navigation.

Figure 2:
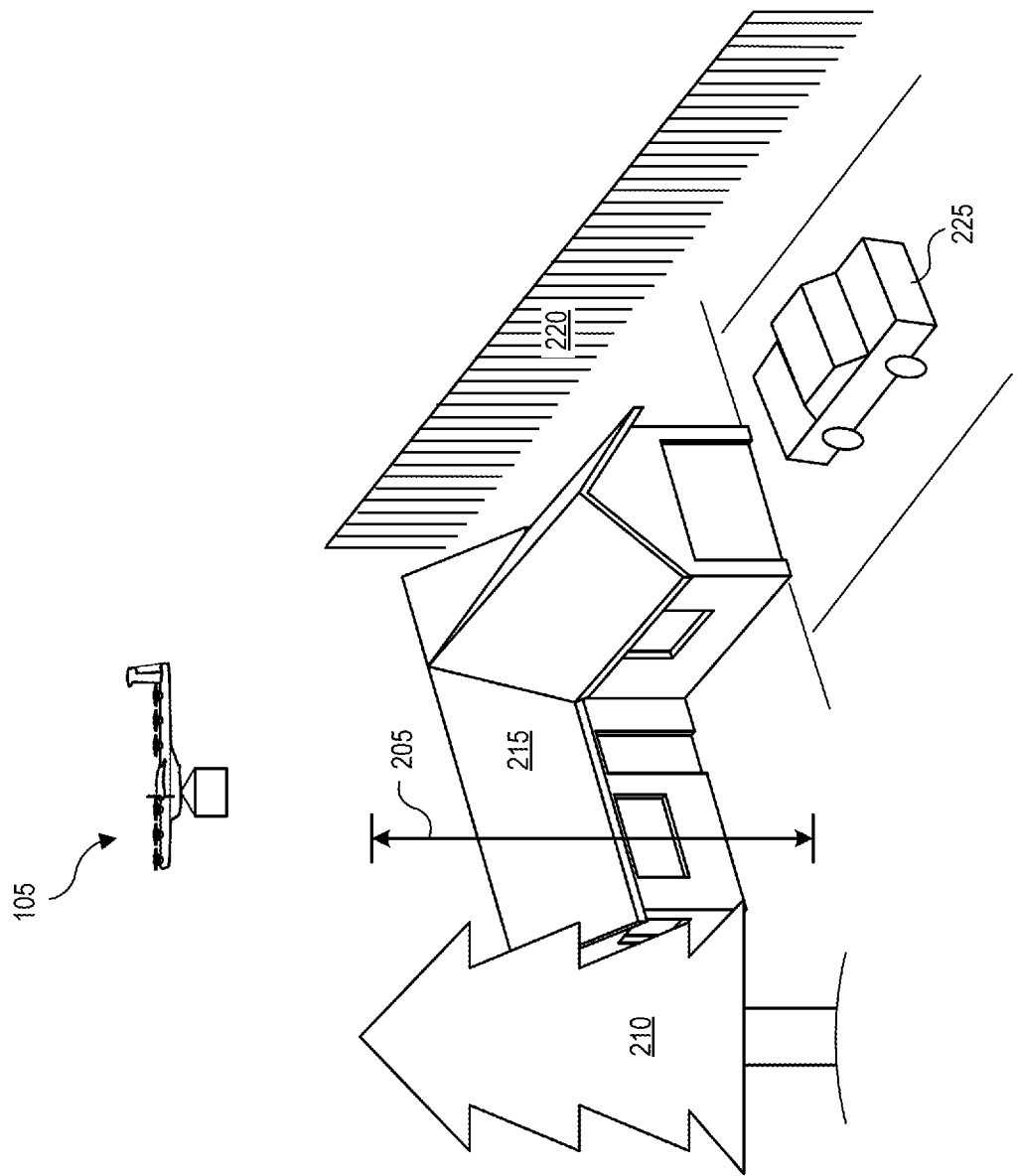
FIG. 2 illustrates how estimating a visual motion factor is used to improve the exposure of aerial images, relative to conventional auto-exposure (AE) control, for vision-based autonomous navigation of a UAV, in accordance with an embodiment of the disclosure.

FIG. 2 illustrates one of these mission phases where UAV 105 has arrived over destination area 115 and is preparing to descend to a delivery height 205 for package drop off. Prior to descending, UAV 105 may acquire one or more aerial images of the ground area below UAV 105 with its onboard camera system. The built in AE/AG functions may compute one or more exposure control settings (e.g., exposure time, sensor gain, aperture size, etc.), which are adjusted based on a visual motion factor estimated from UAV speed and altitude. Additionally, (or alternatively) UAV 105 may perform a variety of other tasks to adjust or optimize an exposure control setting, as described below. With optimized exposure control setting(s), UAV 105 then descends towards delivery height 205 while using vision-based navigation techniques to avoid ground based obstacles such as tree 210, house 215, fence 220, or car 225.

Figure 3:
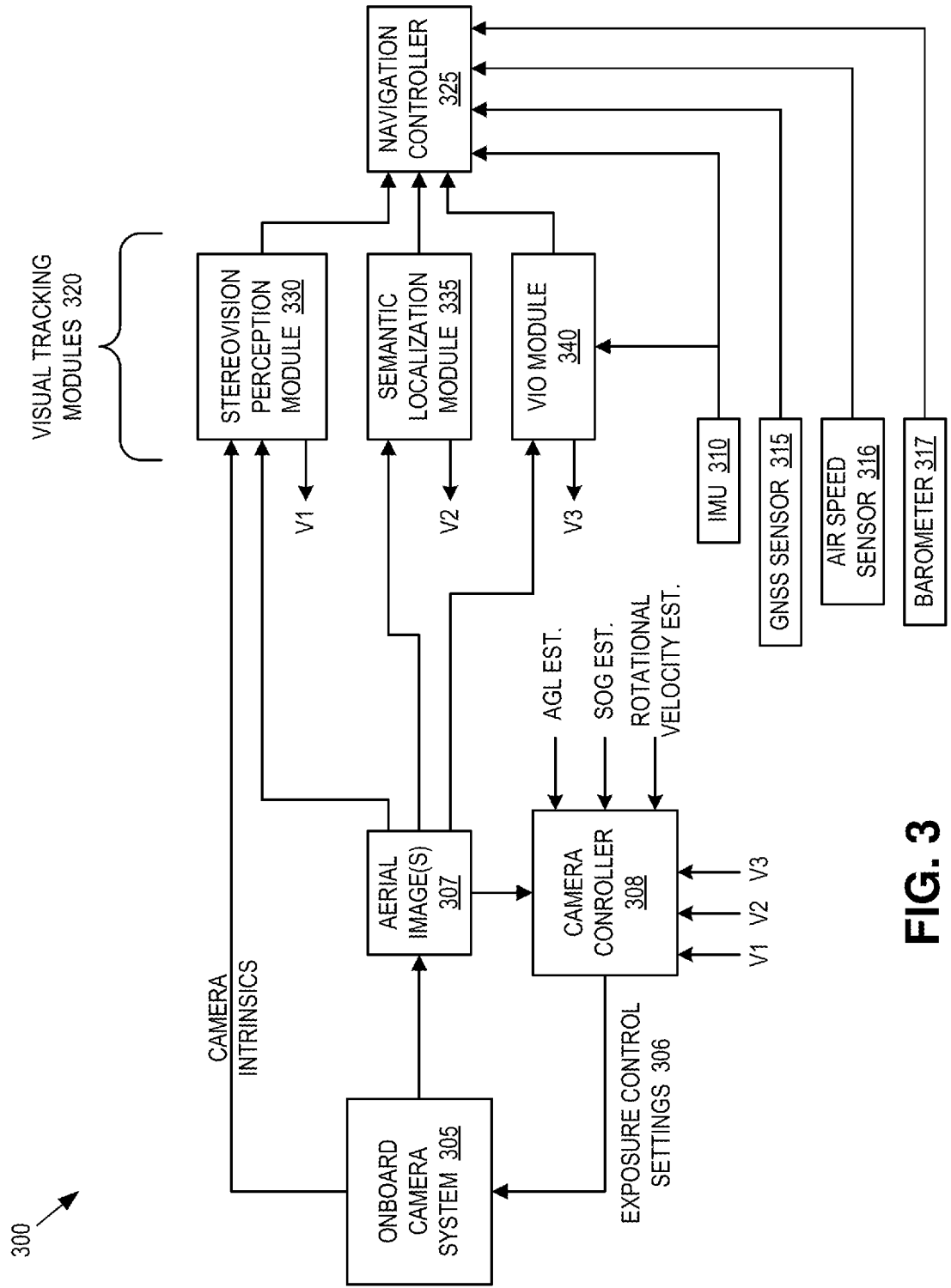
FIG. 3 is a functional block diagram illustrating an exposure control system for vision-based navigation of UAVs, in accordance with an embodiment of the disclosure.

FIG. 3 is a functional block diagram illustrating an exposure control system 300 for vision-based navigation of UAVs 105, in accordance with an embodiment of the disclosure. System 300 represents the relevant software and hardware elements onboard UAVs 105 for implementing the camera exposure control described herein. The illustrated embodiment of system 300 includes an onboard camera system 305 for acquiring aerial images 307, a camera controller 308, an IMU 310, a GNSS sensor 315, an air speed sensor 316 (e.g., pitot tube), an air pressure sensor 317 (e.g., barometer), visual tracking modules 320, and a navigation controller 325. The illustrated embodiment of visual tracking modules 320 includes a stereovision perception module 330, a semantic localization module 335, and a visual inertial odometry (VIO) module 340.

Onboard camera system 305 is disposed on UAVs 105 with a downward looking position to acquire aerial images 307. Aerial images 307 may be acquired at a regular video frame rate (e.g., 20 f/s, 30 f/s, etc.) and a subset of the images provided to the various visual tracking modules 320 for analysis. In one embodiment, onboard camera system 305 is a stereovision camera system. While capturing aerial images 307, the camera intrinsics along with sensor readings from the onboard perception sensors may be recorded and indexed to aerial images 307. For example, IMU 310 may include one or more of an accelerometer, a gyroscope, or a magnetometer to capture accelerations (linear or rotational), attitude, and heading readings. GNSS sensor 315 may be a global positioning system (GPS) sensor, or otherwise, and output longitude/latitude position, mean sea level (MSL)

altitude, heading, speed over ground (SOG), etc. Air speed sensor 316 captures air speed of UAV 105 while underway, which may serve as a rough approximation for SOG when adjusted for weather conditions. Barometer 317 measures air pressure, which provides MSL altitude, which may be offset using elevation map data to estimate AGL altitude.

During flight missions, visual tracking modules 320 are operated as part of the onboard machine vision system and may constantly receive aerial images 307 and identify objects represented in those aerial images. Stereovision perception module 330 analyzes parallax between stereovision aerial images acquired by onboard camera system 305 to estimate distance to pixels/features/objects in aerial images 307. VIO module 340 estimates the three-dimensional (3D) pose (e.g., position/orientation) of onboard camera system 305 of UAV 105 using aerial images 307 and IMU 310. In other words, VIO module 304 provides ego-motion tracking relative to the surrounding environment of UAV 105. Semantic localization module 335 uses image segmentation to inform object detection and feature tracking within aerial images 307. Feature tracking includes the identification and tracking of features within aerial images 307. Features may include edges, corners, high contrast points, etc. of objects within aerial images 307. Recognized objects may be tracked and the identifications provided to other modules responsible for making real-time flight decisions. Collectively, visual tracking modules 320 provide vision-based analysis and understanding of the surrounding environment, which may be used by navigation controller 325 to inform navigation decisions and perform automated obstacle avoidance, route navigation, etc. Of course, the output from the visual tracking modules 320 may be combined with, or considered in connection with, real-time data from IMU 310, GNSS sensor 315, airspeed sensor 316, and barometer 317 by navigation controller 325 to make informed navigation decisions.

Camera controller 308 operates to improve the image quality of aerial images 307 used by visual tracking modules 320 by adjusting exposure control settings 306. Exposure control settings 306 may include one or more of an exposure time setting (e.g., shutter speed), sensor gain setting, or an aperture size setting. In one embodiment, camera controller 308 includes conventional auto-exposure (AE) and/or auto-gain (AG) functions, which settings may be offset/refined using the techniques described in connection with FIGS. 4A and 4B. Camera controller 308 may be external to onboard camera system 305 (illustrated), fully integrated into onboard camera system 306, or be partially integrated into onboard camera system 305 and partially external thereto. In one embodiment, the AE and/or AG functions of camera controller 308 are built in functions of onboard camera system 305 and camera controller 308 receives the default AE/AG settings from onboard camera system 305 for further offset/refinement. The AE function (whether internal or external to onboard camera system 305) may compute an initial/default exposure value for each aerial image 307 and camera controller 308 then further refines or offsets these values to adjust the exposure settings of onboard camera system 305, as described below. In various embodiments, camera controller 308 may use one or more signals when adjusting exposure control settings 306. These signals may include: an estimated AGL altitude, an estimated SOG, an estimated rotational velocity, and feedback signals V1, V2, or V3 from visual tracking modules 320. The feedback signals V1-V3 implement a sort of voting mechanism indicating preferences in the image quality of aerial images 307 as camera controller 308 adjusts one or more exposure control settings 306.

Figure 4A:
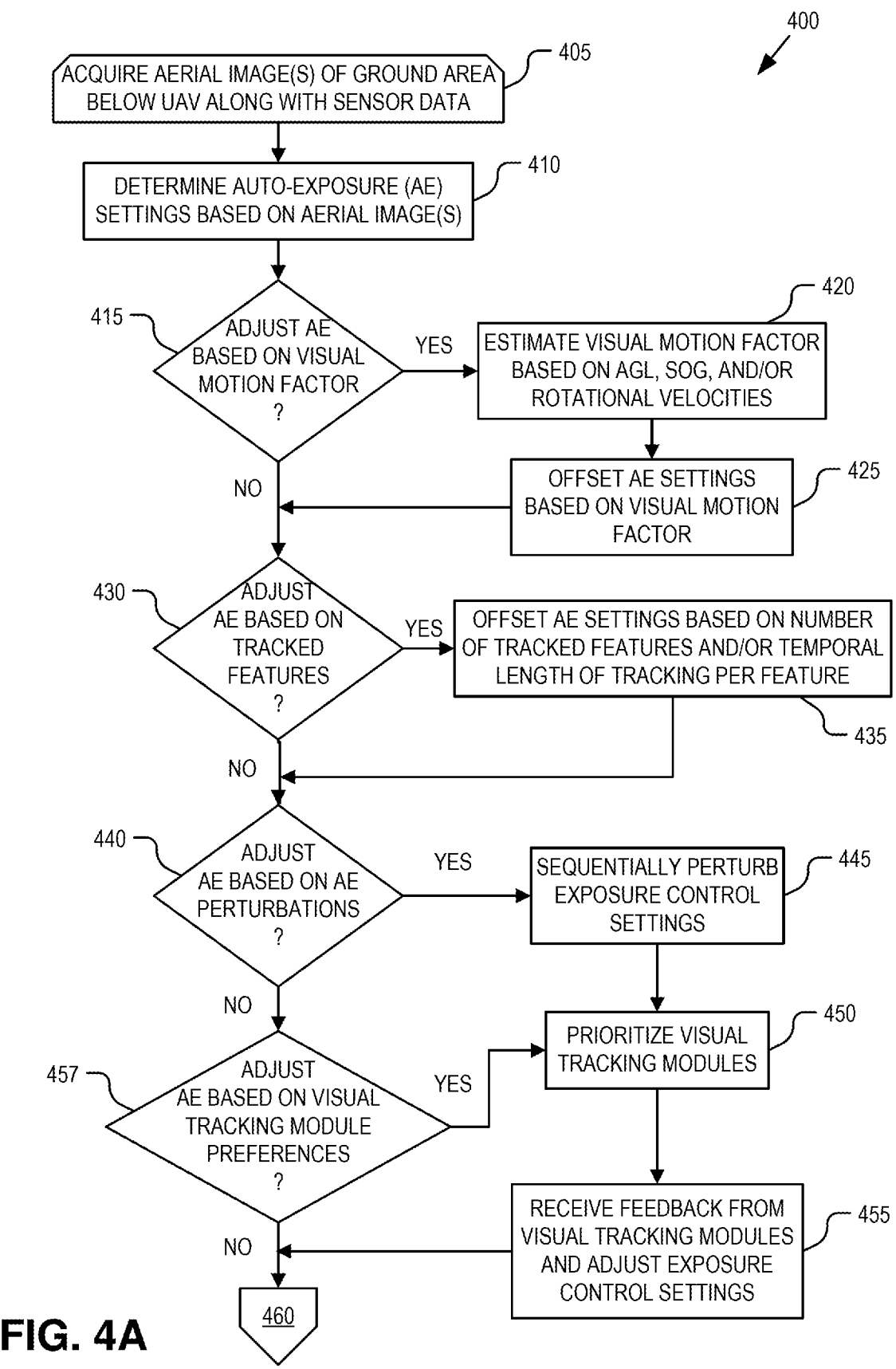
FIGS. 4A & 4B include a flow chart illustrating a process for adjusting exposure control settings of an onboard camera system used for vision-based navigation of a UAV, in accordance with an embodiment of the disclosure.
Figure 4B:
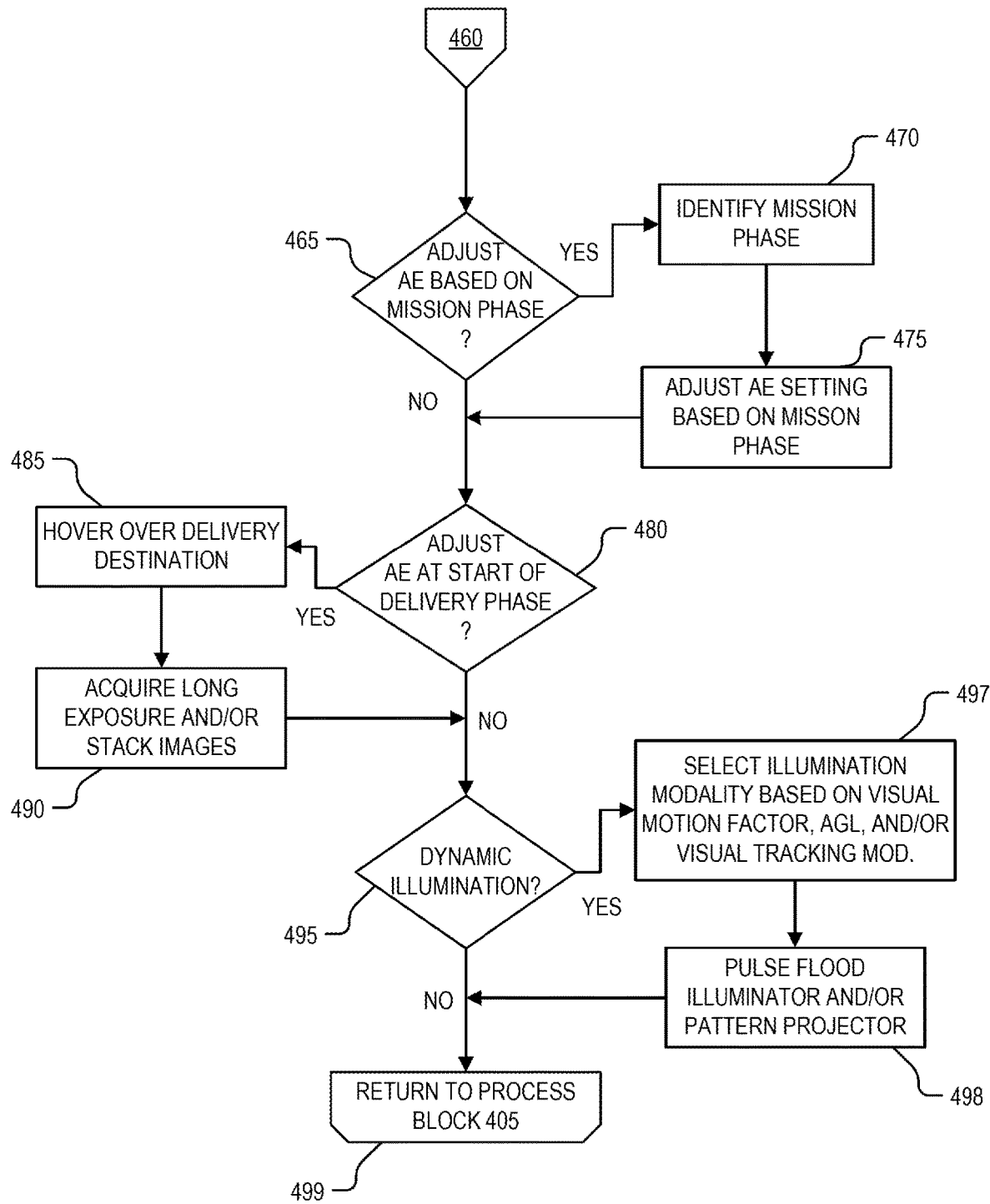

FIGS. 4A & 4B are a flow chart illustrating a process 400 for adjusting exposure control settings 306 of onboard camera system 305 used for vision-based navigation of a UAV, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, UAV 105 acquires one or more aerial images 307 of a ground area below UAV 105 with onboard camera system 305. The ground area may be destination area 115 or any other portion of the ground along its route during a flight mission (e.g., UAV delivery mission). In connection with acquiring aerial images 307, UAV 105 may also record perception sensor data output from one or more onboard perception sensor and indexes these values to their associated aerial images 307. For example, outputs from IMU 310, GNSS sensor 315, airspeed sensor 316, barometer 317, camera settings/intrinsics, and even stereovision depth values output from onboard camera system 305 may be recorded. Other perception sensors may also be included (e.g., lidar sensor, etc.) and those outputs recorded and indexed as well.

Initially, an AE function may be executed to determine an initial AE setting (e.g., exposure time) for onboard camera system 305 (process block 410). This initial AE setting may be determined by calculating an exposure value (e.g., average picture luminance) for a given aerial image 307, which in turn is used to select the initial AE setting. The AE function itself may operate as a successive feedback loop that zeros in on a default/initial AE setting. With a default/initial AE setting determined using conventional AE functions, camera controller 308 may optionally apply one or more of the following offsets/adjustments to further refine and optimize the image quality of aerial images 307 to improve operation of visual tracking modules 320.

One such optional adjustment (decision block 415) is the estimation of a visual motion factor in process block 420. The visual motion factor represents the amount of motion UAV 105 would expect to see in a given aerial image 307. The visual motion factor is a sort of measure of image blur, if shutter speed were held constant. The visual motion factor may be estimated based upon speed, altitude, and rotational velocity (pitch, roll, or yaw). For example, a higher SOG for a fixed AGL altitude will increase the visual motion factor. However, a higher AGL altitude for a fixed SOG will decrease the visual motion factor since the features/objects in aerial images 307 will move slower through the field of view (FOV) at higher altitudes. Finally, any pitch, roll, or yaw will also introduce visual motion. In one embodiment, the visual motion factor may be estimated as directly proportional to SOG, inversely proportional to AGL altitude, and proportional to rotational velocity. In a process block 425, the estimated visual motion factor may be used to adjust an exposure control setting 306 to account for the visual motion. The adjustment of an exposure control setting 306 may include offsetting an initial AE setting determined in process block 410. The offset may be used to increase exposure time (decrease shutter speed) in low light settings at higher altitudes or slower SOG than the built-in AE function would otherwise suggest while achieving acceptable image blur for operation of visual tracking modules 320. In one embodiment, the offset is a nudge or incremental adjustment in the AE settings (e.g., one or more of shutter speed, image sensor gain, or aperture value) initially selected by the AE function of onboard camera system 305. In one embodiment, the adjustment/offset to the exposure control setting may be implemented as an adjustment/offset of a "target exposure value" while allowing the built-in AE function select the specific combination of shutter speed/integration time, gain, or aperture size to achieve the target exposure value.

Another optional adjustment (decision block 430) is offsetting/adjusting one or more initial AE settings based on tracked features (process block 435). Navigation controller 325 and/or a visual tracking module 320 may track features in aerial images 307 during vision-based navigation of UAV 105. For example, semantic localization module 335 may identify and track one or more features in aerial images 307. A feature may include edges, corners, interfaces, transitions, etc. of objects in aerial images 307. Multiple features may be identified in a single aerial image 307 and these features may be tracked over time across sequential aerial images 307 in a video stream of aerial images 307. The more features that are identifiable (and thus trackable) in a given aerial image 307 and/or the longer each identified feature is trackable on average may be interpreted as indicia of more suitable exposure control settings for vision-based navigation. In one embodiment, the number of tracked features (or changes thereof) may be used to adjust an exposure control setting (e.g., offset an initial AE setting). In one embodiment, the temporal length of tracking (i.e., temporal persistence or track length) may additionally, or alternatively, be used to adjust an exposure control setting. For example, the average track length of a set of features may be used. In one embodiment, the average track length is measured in sequential image frames across which the tracked features persist. Larger feature counts or longer track lengths are interpreted as indicia of improving image quality for visual tracking modules 320. Correspondingly, fewer feature counts or shorter track lengths are indicia of decreasing image quality. Feature thresholds (either feature count thresholds or track length thresholds) may be used to instruct incremental increases or decreases in the exposure control settings 306.

Another optional adjustment (decision block 440) is offsetting/adjusting one or more initial AE settings based on sequential perturbations of exposure control settings 306 of onboard camera system 305 (process block 445). In other words, the one or more exposure control settings may be sequentially increased or decreased via perturbations implemented by camera controller 308. One or more of visual tracking modules 320 can then provide feedback signals V1, V2, or V3 to camera controller 308 indicating how the sequential perturbations affect their respective operations (process block 455). In the illustrated embodiment, camera controller 308 can further prioritize visual tracking modules 320 (process block 450) and apply preferences (e.g., weighted preferences) to feedback signals V1, V2, or V3. Thus, camera controller 308 can adjust exposure control settings 306 (process block 455) to tailor the image quality of aerial images 307 to visual tracking modules 320 as biased by the prioritizations (process block 450).

In one embodiment, the prioritization executed in process block 450 may be dynamic. In other words, another optional adjustment (decision block 457) is to adjust exposure control settings 306 based on dynamically changing prioritizations. For example, the prioritization or biases may change depending upon mission phase to prefer feedback from one visual tracking module 320 over another one. In one embodiment, when UAV 105 is operating in a cruise mission phase typically associated with higher altitudes, then feedback signal V2 from semantic localization module 335 is preferred, while feedback signal V3 of VIO module 340 is preferred during a delivery/hover mission phase at lower altitude. Of course, other factors for dynamically changing biases between feedback signals V1, V2, or V3 may be considered as well.

Process 400 continues to FIG. 4B via off page reference 460. Another optional adjustment (decision block 465) is offsetting/adjusting exposure control settings 306 based on the current mission phase. Accordingly, camera controller 308 identifies the current mission phase (process block 470) and applies a predetermined offset/adjustment to the initial AE setting determined by the AE function of onboard camera system 305. The offset/adjustment is then applied via exposure control settings 306 (process block 475).

Another mission phase dependent adjustment includes adjustments to the exposure control settings 306 performed at the start of a delivery phase (decision block 480). In a process block 485, upon UAV 105 arriving at delivery destination 115 and prior to descending to the package drop off altitude, UAV 105 hovers over delivery destination 115. While hovering with limited or no motion, camera controller 308 extends the exposure time of onboard camera system 305 to acquire one or more long exposure aerial images 307. The extended exposure time may be longer than a regular exposure time otherwise used for vision-based navigation of UAV 105 while underway. These long exposure images can help semantic localization module 335 identify ground-based obstacles in low light conditions, which navigation controller 325 can then avoid during package drop-off. In some embodiments, onboard camera system 305 may additionally (or alternatively) acquire a plurality of aerial images 307 each with different exposure control settings 306 for image stacking to acquire high dynamic range aerial images, high contrast aerial images, or aerial images otherwise suitable for use by visual tracking modules 320 in low light conditions (process block 490).

Finally, yet another optional adjustment (decision block 495) is the application of dynamic illumination. In one embodiment, UAV 105 selects an illumination modality from a plurality of illumination modalities for illuminating the scene below UAV 105 based on the visual motion factor, the AGL altitude, or the type of visual tracking that is analyzing aerial image 307 at a given moment for navigation controller 325. For example, UAV 105 may include two or more illumination modalities including infrared (IR) flood illumination and an IR pattern projection. Each illumination modality may be better suited than the other for a particular amount of visual motion, AGL altitude, mission phase, or visual tracking module 320. For example, IR flood illumination may be better suited for higher altitude while IR pattern projection may be suitable for low altitude obstacle avoidance using VIO module 340. In yet another example, IR flood illumination may be better suited for VIO while IR pattern projection is better suited for stereovision obstacle avoidance. In the illustrated embodiment, the different illumination modalities may be pulsed and/or interleaved. Pulsed and/or interleaved multimodal illumination may enable each visual tracking module 320 to use its preferred illumination modality for a preferred duty cycle or heat management regime.

Process 400 repeats at process block 499.

Figure 5A:
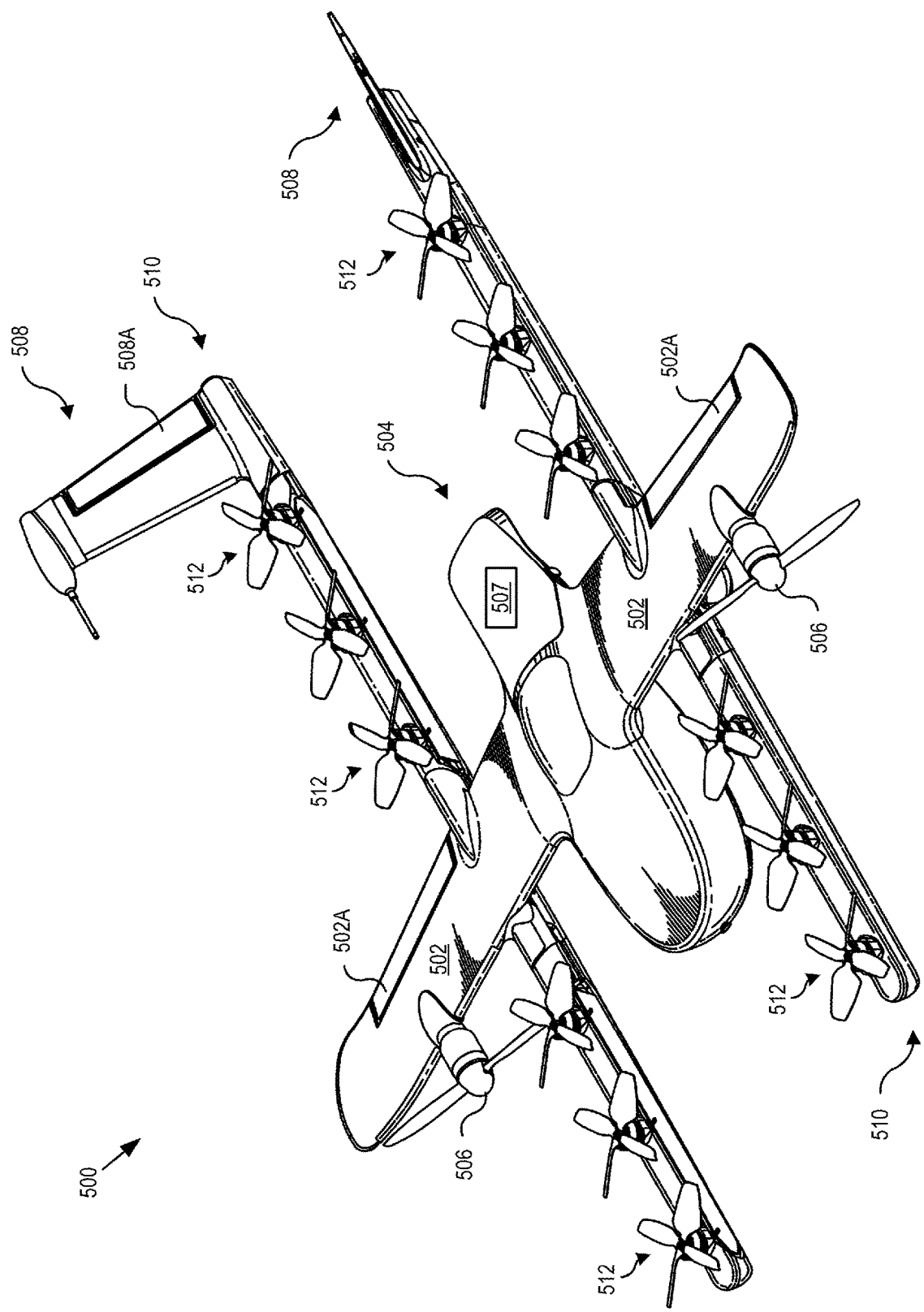
FIG. 5A is a perspective view illustration of a UAV configured for use in a UAV delivery system, in accordance with an embodiment of the disclosure.
Figure 5B:
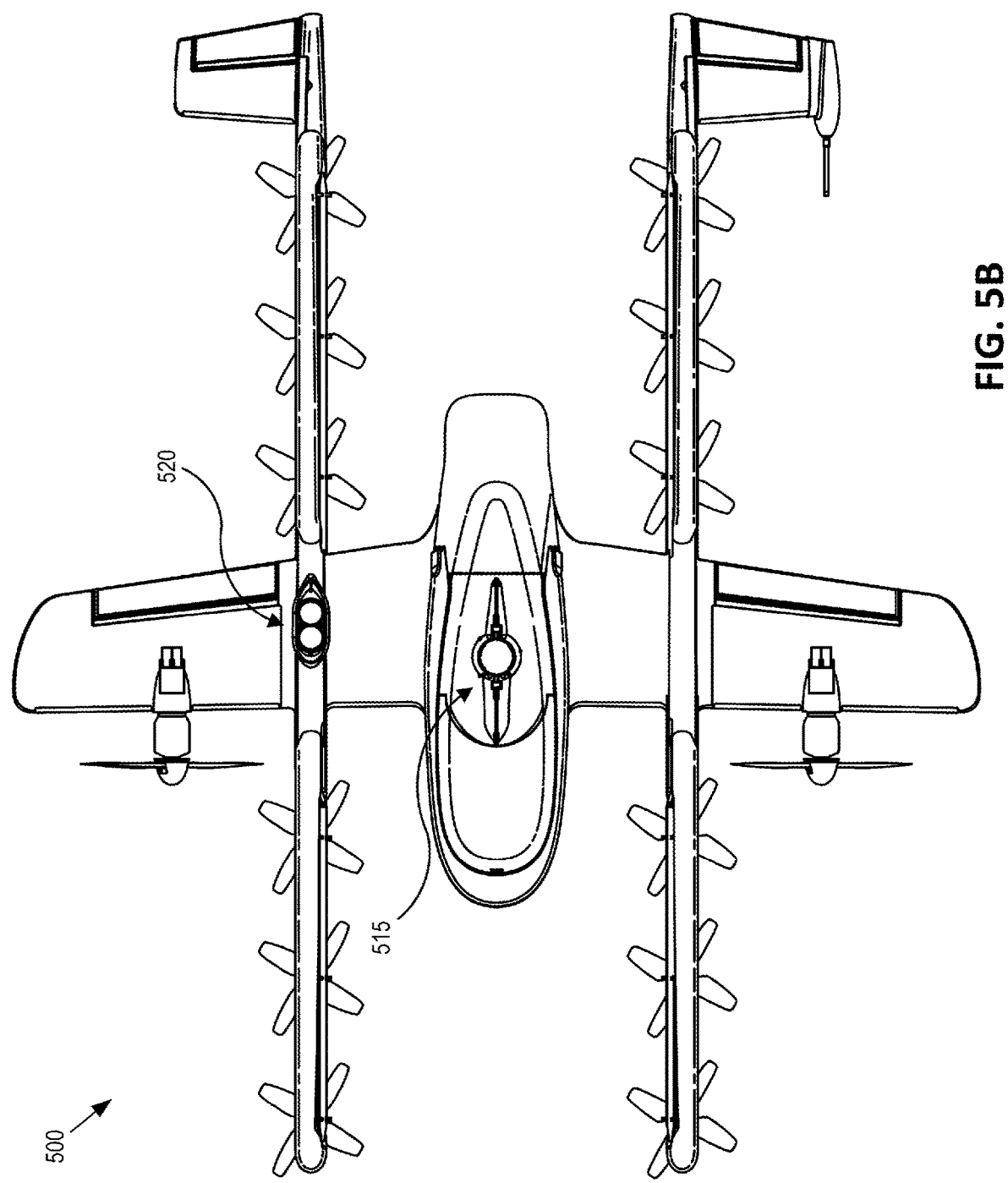
FIG. 5B is an underside plan view illustration of the UAV configured for use in the UAV delivery system, in accordance with an embodiment of the disclosure.

FIGS. 5A and 5B illustrate a UAV 500 that is well suited for delivery of packages, in accordance with an embodiment of the disclosure. FIG. 5A is a topside perspective view illustration of UAV 500 while FIG. 5B is a bottom side plan view illustration of the same. UAV 500 is one possible implementation of UAVs 105 illustrated in FIG. 1, although other types of UAVs may be implemented as well.

The illustrated embodiment of UAV 500 is a vertical takeoff and landing (VTOL) UAV that includes separate propulsion units 506 and 512 for providing horizontal and vertical propulsion, respectively. UAV 500 is a fixed-wing aerial vehicle, which as the name implies, has a wing assembly 502 that can generate lift based on the wing shape and the vehicle's forward airspeed when propelled horizontally by propulsion units 506. The illustrated embodiment of UAV 500 has an airframe that includes a fuselage 504 and wing assembly 502. In one embodiment, fuselage 504 is modular and includes a battery module, an avionics module, and a mission payload module. These modules are secured together to form the fuselage or main body.

The battery module (e.g., fore portion of fuselage 504) includes a cavity for housing one or more batteries for powering UAV 500. The avionics module (e.g., aft portion of fuselage 504) houses flight control circuitry of UAV 500, which may include a processor and memory, communication electronics and antennas (e.g., cellular transceiver, wifi transceiver, etc.), and various sensors (e.g., GNSS sensor, an inertial measurement unit, a magnetic compass, a radio frequency identifier reader, etc.). Collectively, these functional electronic subsystems for controlling UAV 500, communicating, and sensing the environment may be referred to as a control system 507. Control system 507 may incorporate the functional components of system 300 described in connection with FIG. 3. The mission payload module (e.g., middle portion of fuselage 504) houses equipment associated with a mission of UAV 500. For example, the mission payload module may include a payload actuator 515 (see FIG. 5B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 5B, an onboard camera 520 (e.g., onboard camera system 305) is mounted to the underside of UAV 500 to support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV with a handle for accessing destination, delivery, and package validation information. Of course, onboard camera 520 may alternatively be integrated within fuselage 504.

As illustrated, UAV 500 includes horizontal propulsion units 506 positioned on wing assembly 502 for propelling UAV 500 horizontally. UAV 500 further includes two boom assemblies 510 that secure to wing assembly 502. Vertical propulsion units 512 are mounted to boom assemblies 510. Vertical propulsion units 512 providing vertical propulsion. Vertical propulsion units 512 may be used during a hover mode where UAV 500 is descending (e.g., to a delivery location), ascending (e.g., at initial launch or following a delivery), or maintaining a constant altitude. Stabilizers 508 (or tails) may be included with UAV 500 to control pitch and stabilize the aerial vehicle's yaw (left or right turns) during cruise. In some embodiments, during cruise mode vertical propulsion units 512 are disabled or powered low and during hover mode horizontal propulsion units 506 are disabled or powered low.

During flight, UAV 500 may control the direction and/or speed of its movement by controlling its pitch, roll, yaw, and/or altitude. Thrust from horizontal propulsion units 506 is used to control air speed. For example, the stabilizers 508 may include one or more rudders 508a for controlling the aerial vehicle's yaw, and wing assembly 502 may include elevators for controlling the aerial vehicle's pitch and/or ailerons 502a for controlling the aerial vehicle's roll. While the techniques described herein are particularly well-suited for VTOLs providing an aerial delivery service, it should be appreciated that adjusting exposure control settings as described herein is applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 5A and 5B illustrate one wing assembly 502, two boom assemblies 510, two horizontal propulsion units 506, and six vertical propulsion units 512 per boom assembly 510, it should be appreciated that other variants of UAV 500 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of camera exposure control for vision-based navigation of an unmanned aerial vehicle (UAV), the method comprising:
   acquiring an aerial image of a ground area below the UAV with an onboard camera system of the UAV;
   estimating a visual motion factor based on a speed of the UAV and an altitude of the UAV; and
   adjusting an exposure control setting of the onboard camera system based on the visual motion factor, wherein the visual motion factor has an inverse relationship with the altitude of the UAV and a direct relationship with the speed of the UAV.

2. The method of claim 1, further comprising:
   calculating an exposure value for the aerial image with an auto-exposure (AE) function of the onboard camera system; and
   determining an auto-exposure (AE) setting for the onboard camera system based on the exposure value,
   wherein adjusting the exposure control setting comprises offsetting the AE setting by an amount determined based on the visual motion factor.

3. The method of claim 1, wherein the speed of the UAV comprises a speed over ground (SOG) and the altitude of the UAV comprises an above ground level (AGL) altitude.

4. The method of claim 1, wherein estimating the visual motion factor comprises estimating the visual motion factor based on the speed of the UAV, the altitude of the UAV, and a rotational velocity of the UAV.

5. The method of claim 1, wherein the exposure control setting comprises at least one of a shutter speed, an image sensor gain, or an aperture value of the onboard camera system.

6. The method of claim 1, further comprising:
   tracking one or more features in the aerial image,
   wherein adjusting the exposure control setting of the onboard camera system further comprises adjusting the exposure control setting based on a number of the one or more features tracked in the aerial image or a temporal length of tracking the one or more features.

7. The method of claim 1, further comprising:
   sequentially perturbing the exposure control setting of the onboard camera system; and
   receiving one or more feedback signals from one or more visual tracking modules disposed onboard the UAV, wherein the one or more feedback signals indicate how the sequential perturbing affects operation of the one or more visual tracking modules, wherein adjusting the exposure control setting of the onboard camera system further comprises adjusting the exposure control setting based on the one or more feedback signals from the one or more visual tracking modules.

8. The method of claim 7, wherein the one or more visual tracking modules comprises a plurality of visual tracking modules, the method further comprising:
   prioritizing the visual tracking modules; and
   preferencing one of the feedback signals from one of the visual tracking modules over another one of the visual tracking modules when adjusting the exposure control setting.

9. The method of claim 8, wherein prioritizing the visual tracking modules comprises dynamically prioritizing the visual tracking modules based on a mission phase of the UAV.

10. The method of claim 1, further comprising:
    identifying a current mission phase of a delivery mission of the UAV,
    wherein adjusting the exposure control setting further comprises adjusting the exposure control setting based on the current mission phase.

11. The method of claim 1, further comprising:
    hovering over a delivery destination prior to descending the UAV to a delivery height; and
    acquiring the aerial image with an extended exposure time while hovering over the delivery destination, wherein the extended exposure time is longer than a regular exposure time otherwise used for the vision-based navigation of the UAV.

12. The method of claim 1, further comprising:
    selecting an illumination modality from a plurality of illumination modalities for illuminating a scene below the UAV based on at least one of the visual motion factor, an above ground level (AGL) altitude, or a type of visual tracking that is analyzing the aerial image for navigation;
    pulsing the selected illumination modality while acquiring the aerial image; and
    interleaving the selected illumination modality with another illumination modality.

13. The method of claim 1, further comprising:
    autonomously navigating the UAV based on aerial images, including the aerial image, acquired by the onboard camera system, wherein the autonomous navigation includes making navigation decision based on at least one of stereovision depth perception, semantic localization, or visual inertial odometry.

14. At least one non-transitory computer-readable medium having instructions stored thereon that, in response to execution by one or more processors of an unmanned aerial vehicle (UAV), cause the UAV to perform operations comprising:
    acquiring an aerial image of a ground area below the UAV with an onboard camera system of the UAV;
    estimating a visual motion factor based on a speed of the UAV and an altitude of the UAV; and
    adjusting an exposure control setting of the onboard camera system based on the visual motion factor, wherein the visual motion factor has an inverse relationship with the altitude of the UAV and a direct relationship with the speed of the UAV.

15. The at least one non-transitory computer-readable medium of claim 14, the operations further comprising:
    calculating an exposure value for the aerial image with an auto-exposure (AE) function of the onboard camera system; and
    determining an auto-exposure (AE) setting for the onboard camera system based on the exposure value, wherein adjusting the exposure control setting comprises offsetting the AE setting by an amount determined based on the visual motion factor.

16. The at least one non-transitory computer-readable medium of claim 14, wherein the speed of the UAV comprises a speed over ground (SOG) and the altitude of the UAV comprises an above ground level (AGL) altitude.

17. The at least one non-transitory computer-readable medium of claim 14, wherein estimating the visual motion factor comprises estimating the visual motion factor based on the speed of the UAV, the altitude of the UAV, and a rotational velocity of the UAV.

18. The at least one non-transitory computer-readable medium of claim 14, further comprising:
    tracking one or more features in the aerial image,
    wherein adjusting the exposure control setting of the onboard camera system further comprises adjusting the exposure control setting based on a number of the one or more features tracked in the aerial image or a temporal length of tracking the one or more features.

19. At least one non-transitory computer-readable medium having instructions stored thereon that, in response to execution by one or more processors of an unmanned aerial vehicle (UAV), cause the UAV to perform operations comprising:
    acquiring an aerial image of a ground area below the UAV with an onboard camera system of the UAV;
    sequentially perturbing an exposure control setting of the onboard camera system;
    receiving one or more feedback signals from one or more visual tracking modules disposed onboard the UAV, wherein the one or more feedback signals indicate how the sequential perturbing affects operation of the one or more visual tracking modules; and
    adjusting the exposure control setting based on the one or more feedback signals from the one or more visual tracking modules.

20. The at least one non-transitory computer-readable medium of claim 19, wherein the one or more visual tracking modules comprises a plurality of visual tracking modules, the method further comprising:
    prioritizing the visual tracking modules; and
    preferencing one of the feedback signals from one of the visual tracking modules over another one of the visual tracking modules when adjusting the exposure control setting.

21. At least one non-transitory computer-readable medium having instructions stored thereon that, in response to execution by one or more processors of an unmanned aerial vehicle (UAV), cause the UAV to perform operations comprising:
    acquiring an aerial image of a ground area below the UAV with an onboard camera system of the UAV;
    identifying a current mission phase of a delivery mission of the UAV; and
    adjusting an exposure control setting of the onboard camera system based on the current mission phase.

* * * * *